(12) United States Patent
McGee

(10) Patent No.: US 7,686,615 B1
(45) Date of Patent: Mar. 30, 2010

(54) MINIATURE HOUSE WITH MULTI-PURPOSE DRAWER

(76) Inventor: Ted McGee, P.O. Box 24891, San Jose, CA (US) 95154

( * ) Notice: Subject to any disclaimer, the term of this patent is extended or adjusted under 35 U.S.C. 154(b) by 1038 days.

(21) Appl. No.: 11/326,544

(22) Filed: Jan. 4, 2006

(51) Int. Cl.
*G09B 25/00* (2006.01)

(52) U.S. Cl. ............................................. 434/72

(58) Field of Classification Search ............ 434/72, 434/79, 81, 84; D3/270, 271.6; D6/396, D6/422, 432, 434, 435, 436; D9/636–638; D19/35; 446/476, 478, 479
See application file for complete search history.

(56) References Cited

U.S. PATENT DOCUMENTS

| D37,342 S | * | 2/1905 | Dzubay ...................... D6/434 |
| D84,556 S | * | 6/1931 | Wachtel ...................... D6/434 |
| D104,059 S | | 4/1937 | Bensel |
| 2,470,993 A | * | 5/1949 | Kramer ...................... 312/217 |
| D177,917 S | * | 6/1956 | Luft ........................... D3/271.6 |
| 3,174,814 A | * | 3/1965 | Kershaw ..................... 312/204 |
| 4,131,227 A | * | 12/1978 | Patton ........................... 229/8 |
| D267,376 S | * | 12/1982 | Lenger, Jr. .................. D6/434 |
| 4,765,006 A | * | 8/1988 | Jackson et al. ................. 5/658 |
| 5,389,248 A | * | 2/1995 | Pare et al. ................... 210/151 |
| 5,394,989 A | * | 3/1995 | Delson ....................... 206/457 |
| D370,343 S | * | 6/1996 | Kraner ...................... D3/271.6 |
| D383,328 S | * | 9/1997 | Bro et al. ..................... D6/434 |
| 5,868,574 A | | 2/1999 | Randle |
| D409,261 S | | 5/1999 | Kelley |
| 6,074,211 A | | 6/2000 | Reid |
| D450,357 S | | 11/2001 | Yamazaki |
| 6,581,822 B1 | * | 6/2003 | Garran ...................... 229/116.4 |
| D498,083 S | * | 11/2004 | Bishop ....................... D6/434 |
| 7,229,334 B2 | * | 6/2007 | Ishikawa ...................... 446/91 |
| 2002/0014525 A1 | * | 2/2002 | Webb ............................ 232/45 |
| 2004/0176012 A1 | * | 9/2004 | Hirtz ........................... 446/476 |
| 2006/0009121 A1 | * | 1/2006 | Rotundo et al. ............. 446/476 |

* cited by examiner

*Primary Examiner*—Kurt Fernstrom
(74) *Attorney, Agent, or Firm*—Kolisch Hartwell, P.C.

(57) ABSTRACT

A miniature house no larger than 4 inches in any dimension having a drawer that is extensible from one wall close to the base of the wall. The drawer serves a number of purposes according to the scope of the invention. In one embodiment, a porous pad is positioned in the drawer and serves as a medium for growing miniature plants—preferably mosses and grasses. Means for moisturizing the pad are provided. In other applications, the house is an interesting devoid for dispensing business cards. In another embodiment, the drawer holds watercolors and stamps enabling the user to apply his own arrangement of doors and window.

20 Claims, 2 Drawing Sheets

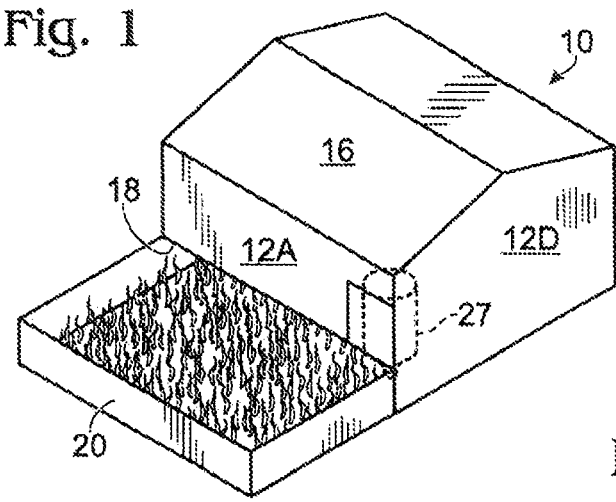
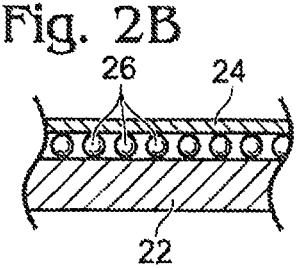
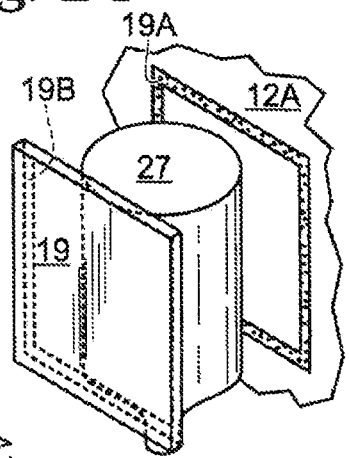
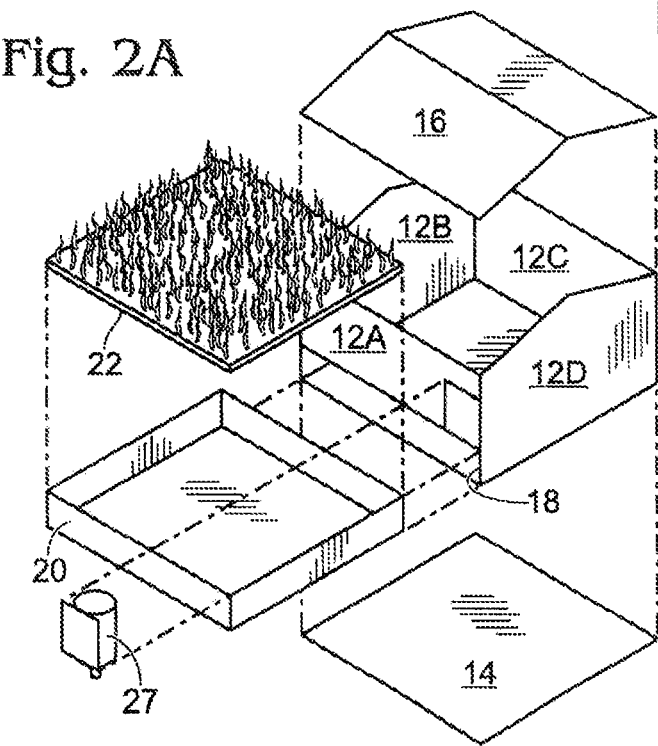

MINIATURE HOUSE WITH MULTI-PURPOSE DRAWER

FIELD OF THE INVENTION

This invention relates to miniature houses for novelty purposes and particularly to a house with a drawer where the drawer is used for growing mosses, etc.

BACKGROUND AND INFORMATION DISCLOSURE

Miniature houses have been disclosed for use in decorative and other purposes.

For example, D 145,328 discloses a house in the form of a church which is used to store a ring.

D 104,059 discloses a design of a miniature house for decorative purposes.

U.S. Pat. No. 6,074,211 discloses an educational device related to constructing a small house.

U.S. Pat. No. 5,868,574 discloses a model house of components for educational purposes.

D 450,357 discloses a house having a unique oriental motif.

D 409,261 discloses a house having an open structure.

D 427,649 discloses a house having a front porch.

U.S. Pat. No. 6,072,211 discloses an educational structure.

A miniature house is useful in some venues because it relates to a yearning that many people have to own their own suburban cottage in the center of a landscaped lot. Children are attracted to miniature houses because they often relate to the child's growth into the responsibilities of the adult world.

SUMMARY OF THE INVENTION

It is an object of this invention to provide a miniature house that generates a response in adults that resonates with the common desire that many people have to own their own home.

It is an object that the house be decorative and have a size consistent with placing it on a desk top.

It is another object to provide a toy to a child that teaches him to develop a sense of achievement by taking care of something which depends on him for its ultimate development.

This invention is directed toward a miniature house comprising four walls and a ceiling on a base panel. A slot is formed along one edge of one vertical wall where the wall would otherwise be connected to the base panel. Drawer is slid into the slot so that the drawer may occupy any position being inside or outside the house. The house is made of any one of plastic or cardboard. The drawer is made of plastic so that it will resist deterioration due to moisture.

In one embodiment, the drawer holds a bed of vegetation such as mosses or grasses. This is accomplished by providing a pad which will absorb moisture on which the vegetation will grow. The pad will therefore usually be a compost of compressed sawdust, or fiber. For some mosses, the pad is a porous ceramic.

For merchandizing purposes, a sheet of porous tissue paper is adhered to the surface of the pad. A layer of any one of various types of seed selected by the user are located between the tissue layer and the surface of the pad.

Before being positioned in the drawer (such as before the pad is sold in the store), the pad is maintained in a dry condition. After the pad has been positioned in the drawer it is moistened causing the seed to geminate of the moss to come to life and begin growing. Plants can be maintained in a number of drawers and the user can collect particular drawers for display according to the season and condition of his plantings.

In another scenario, the drawer holds (preferably) blocks of watercolors, a small container of water and a small paintbrush. The user paints various features of the house according to his own artistic sense.

In an extension of this embodiment, the drawer also contains rolls of stamps. The stamps are various designs of windows and doors that the user may detach from the roll and apply to the house according to his fancy.

For purposes of supporting the marketing effort of a real estate firm, the house is available in a variety of architectural styles—ranch, New England, salt box, Spanish, French colonial. The drawer holds advertising cards. Each card has a picture of one of the realtor's listed properties with pertinent information—address, price, age, lot size, etc. The selection by the client of any one of the collection of miniature houses helps the realtor and client narrow the field of offerings that the realtor needs to make in order to "zero in" on the property of most likely interest to the client. In a business, such as a realtor's office, a business card may pop up from a stack of cards when the client opens the drawer.

The foregoing discussion illustrates the various ways in which the miniature house with a drawer may be used as a advertising or educational device for various groups in the market. The basic appeal of the invention is that it especially attracts the interest of most of the public who has a fundamental interest in owning a home.

BRIEF DESCRIPTION OF THE DRAWINGS

FIG. 1 shows an assembly view of the miniature house with drawer partially open. The house is New England cracker box style of architecture.

FIG. 2A shows an exploded view of the miniature house.

FIG. 2B shows a sectional view of the pad.

FIG. 2C shows a support for a water dispenser.

DESCRIPTION OF THE BEST EMBODIMENTS

Figure 3:
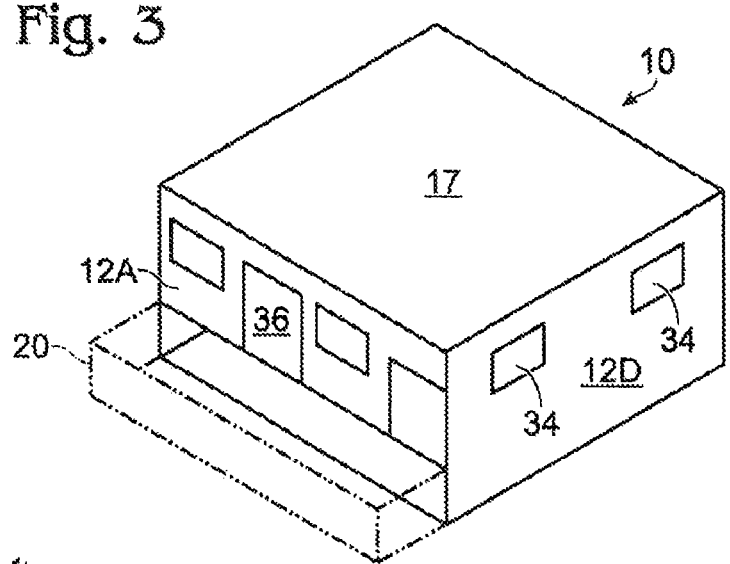
FIG. 3 shows a miniature house having a ranch style architecture.

Turning now to a description of the drawings, FIG. 1 is a perspective assembly view and FIG. 2A is an exploded view of a house 10 of this invention. There are shown four vertical walls 12A, B, C, D on a base panel 14 and a roof 16 mounted on its upper end. No dimension of any wall, base panel, roof or drawer will have a length or width greater than four inches.

A slot 18 in wall 12A extends along the corner between wall 12A and the base panel 14. A drawer 20 slides into the slot 18. In one version of the invention, a pad 22 is positioned in the slot. The pad 22 can be any one of pressed wood chips, ceramic, plastic or rubber sponge. The pad 22 is porous so that it retains moisture.

As shown in the sectional view of FIG. 2B, a thin (biodegradable) tissue paper sheet 24 covers a surface of the pad. A layer of seed 26 is positioned between the pad 22 and paper. The seed 26 are selected by the user according to his desires and are typically one of a variety grasses and moss which are slow growing. These seeds can remain dormant until they receive moisture. Once the seeds receive moisture, they germinate and grow through the tissue paper 24.

The owner may purchase the pad 22 having a particular variety of seed from the market as he chooses. The seeds can be one of a variety of grasses and mosses. The drawer 20 can thereby be an "herb" garden on display in a kitchen as a source of flavoring for beverages or salads.

Moisture can be supplied periodically by maintaining a water level in the tray. The water level is maintained either manually or, as shown in FIG. 2A, by a container (bottle) 26 inside the house. The lower end of the bottle extends to the bottom of the drawer.

As shown in FIG. 2C in one version, the bottle 26 is attached to the inside of a removable door 19 having a Velcro™ strip 19A that detachably adheres to Velcro™ 19B on the wall 12A of the house around the door opening.

The upper end of the bottle is disguised as a chimney with a cap so that water leaks from the bottle into the tray similar to the action of a chicken feeder.

Another scenario for the invention is in a business office, particularly a realtor's office, FIG. 1 shows the architecture according to New England salt box style, FIG. 3 shows the architecture according to ranch style characterized by a flat roof 17.

The presence of the various styles of architecture helps the client select the type of house that is attractive to him and helps the realtor in steering his client toward the most likely candidate for sale.

To support the sales effort, the drawer contains cards wherein each card has information pertinent to the property—a picture, map, address, price, lot size, etc. The miniature house thereby serves a center of interest to generate enthusiasm in the client. The drawer is a repository for business cards to be dispensed to various clients.

Figure 4:
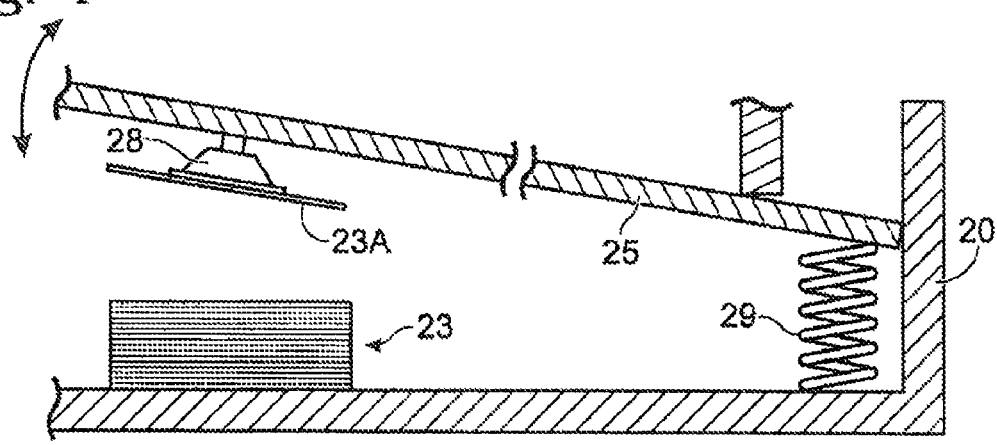
FIG. 4 shows a spring-loaded lever inside the drawer for dispensing business cards.

FIG. 4 shows a drawer 20 with a mechanism for permitting a card 23A to "pop up" from a stack of cards 23. When the drawer 20 is opened. There is shown an arm 25 with a suction cup 28 on one end. The other end is hinged by a spring 29 to the interior surface of the drawer 20. When the drawer 20 is closed, the suction cup 26 is forced against the top card 22A of a stack of cards 22 in the drawer 20. When the drawer 20 is opened, the arm 24 is free to rotate to a position where the card 22A on the end of the arm 24 is accessible to the client.

Figure 5:
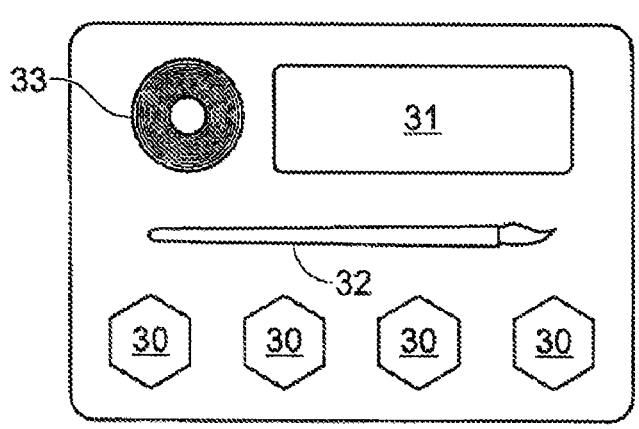
FIG. 5 shows paining utensils positioned inside the drawer.

FIG. 5 shows yet another version of the invention having educational value especially to children. According to this version, the drawer 20 contains an array of watercolor pigments 30 and a small dish 31 integrally formed with the drawer 20 to hold water. An artist's brush 32 is preferably included in the drawer 20. The owner paints the outside of the house choosing various colors for the doors 36 and windows 34 of house 10 in FIG. 3 from the drawer 20.

As a part of the house decorating process, the drawer may also contain one or more rolls 33 of tape with stamps peelably attached to the roll. The stamps are engraved with windows of various designs that the user may detach from the roll 33 and apply to the house 10 in locations according to his tastes.

Variations, modifications and other applications of a miniature house with a drawer may be contemplated after reading the specification and studying the drawings that are within the scope of the invention.

For example, the drawer may be arranged in two tiers. The bottom tier comprises the pad with vegetation or moss. Immediately on top of that tier is another tier holding the coloring utensils. The house can be constructed of cardboard or plastic. The drawer is preferably plastic so that it does not deteriorate in the presence of moisture.

I therefore wish to define the scope of my invention by the appended claims.

What is claimed is:

1. A miniature house, comprising:
   a base panel including a plurality of panel edges;
   a frame including a plurality of walls, at least some of the walls having a first edge and a second edge, the first edge is joined perpendicularly to an edge of a first neighboring wall, the second edge is opposite the first edge and is joined perpendicularly to an edge of a second neighboring wall, wherein the frame is mounted on the base panel and one of the plurality of walls includes a slot adjacent an edge of the base panel;
   a roof remounted on the frame opposite the base panel, wherein the base panel, the frame, and the roof form an enclosure;
   a drawer including a floor and a plurality of drawer walls that are mounted perpendicularly on the floor, the drawer sized to slide through the slot into an interior of the enclosure, wherein length and width of the base panel, each wall of the plurality of walls, the roof, the floor, and each drawer wall of the plurality of drawer walls are no greater than four inches; and
   one or more objects sized to be at least substantially contained within the drawer.

2. The miniature house of claim 1, wherein the one or more objects includes a plurality of water color pigments and artist's paint brush positioned on the floor of the drawer.

3. The miniature house of claim 1, wherein the one or more objects includes at least one roll of paper tape with a plurality of removable stamps on the tape.

4. The miniature house of claim 3, wherein at least some of the stamps are imprinted with a drawing of one of a window and a house for attachment on an outside of the house.

5. The miniature house of claim 1, wherein the one or more objects includes a pad positionable on the floor, the pad including a permeable medium and vegetation configured to grow on a surface of the pad.

6. The miniature house of claim 1, wherein the one or more objects includes advertising literature positioned in the drawer and configured to be accessible when the drawer is opened.

7. The miniature house of claim 1, wherein the one or more objects are sized to be contained within the drawer.

8. A miniature house, comprising:
   a base panel including a plurality of panel edges;
   a frame including a plurality of walls, at least some of the walls having a first edge and a second edge, the first edge is joined perpendicularly to an edge of a first neighboring wall, the second edge is opposite the first edge and is joined perpendicularly to an edge of a second neighboring wall, wherein the frame is mounted on the base panel and one of the plurality of walls includes a single slot adjacent an edge of the base panel;
   a roof mounted on the frame opposite the base panel, wherein the base panel, the frame, and the roof form an enclosure;
   a single drawer including a floor and a plurality of drawer walls that are mounted perpendicularly on the floor, the single drawer sized to slide through the single slot into an interior of the enclosure, wherein length and width of the base panel, each wall of the plurality of walls, the roof, the floor, and each drawer wall of the plurality of drawer walls are no greater than four inches; and
   one or more objects sized to be contained within the drawer.

9. The miniature house of claim 8, wherein the one or more objects includes a plurality of water color pigments and artist's paint brush positioned on the floor of the drawer.

10. The miniature house of claim 8, wherein the one or more objects includes at least one roll of paper tape with a plurality of removable stamps on the tape.

11. The miniature house of claim 10, wherein at least some of the stamps are imprinted with a drawing of one of a window and a house for attachment on an outside of the house.

12. The miniature house of claim 8, wherein the one or more objects includes a pad positionable on the floor, the pad including a permeable medium and vegetation configured to grow on a surface of the pad.

13. The miniature house of claim 8, wherein the one or more objects includes advertising literature positioned in the drawer and configured to be accessible when the drawer is opened.

14. The miniature house of claim 8, wherein the one or more objects are sized to be contained within the drawer.

15. A miniature house, comprising:
  a base panel including a plurality of panel edges;
  a frame including a plurality of walls, at least some of the walls having a first edge and a second edge, the first edge is joined perpendicularly to an edge of a first neighboring wall, the second edge is opposite the first edge and is joined perpendicularly to an edge of a second neighboring wall, wherein the frame is mounted on the base panel and one of the plurality of was includes a single slot adjacent an edge of the base panel;
  a roof mounted on the frame opposite the base panel, wherein the base panel, the frame, and the roof form an enclosure;
  a single drawer including a floor and a plurality of drawer walls that are mounted perpendicularly on the floor, the drawer sized to slide through the single slot into an interior of the enclosure, wherein length and width of the base panel, each wall of the plurality of walls, the roof, the floor, and each drawer wall of the plurality of drawer walls are no greater than four inches, and wherein the base panel, the frame, the roof, and the drawer are made of cardboard; and
  one or more objects sized to be contained within the drawer.

16. The miniature house of claim 15, wherein the one or more objects includes a plurality of water color pigments and artist's paint brush positioned on the floor of the drawer.

17. The miniature house of claim 15, wherein the one or more objects includes at least one roll of paper tape with a plurality of removable stamps on the tape.

18. The miniature house of claim 15, wherein the one or more objects includes a pad positionable on the floor, the pad including a permeable medium and vegetation configured to grow on a surface of the pad.

19. The miniature house of claim 15, wherein the one or more objects includes advertising literature positioned in the drawer and configured to be accessible when the drawer is opened.

20. The miniature house of claim 15, wherein the one or more objects are sized to be contained within the drawer.

\* \* \* \* \*